(12) United States Patent
Bader et al.

(10) Patent No.: US 11,735,987 B2
(45) Date of Patent: Aug. 22, 2023

(54) METHOD AND DEVICE FOR DISPENSING SEALING COMPOUND, AND HOUSING FOR AN ELECTRIC MACHINE

(71) Applicant: Robert Bosch GmbH, Stuttgart (DE)

(72) Inventors: Sascha Bader, Schorndorf (DE); Heinz Reiske, Lichtenstein (DE); Philipp Rohr, Tuebingen (DE); Sebastian Jobst, Stuttgart (DE); Markus Moeller, Pfullingen (DE)

(73) Assignee: Robert Bosch GmbH, Stuttgart (DE)

( * ) Notice: Subject to any disclaimer, the term of this patent is extended or adjusted under 35 U.S.C. 154(b) by 153 days.

(21) Appl. No.: 17/415,855

(22) PCT Filed: Dec. 6, 2019

(86) PCT No.: PCT/EP2019/084061
§ 371 (c)(1),
(2) Date: Jun. 18, 2021

(87) PCT Pub. No.: WO2020/126565
PCT Pub. Date: Jun. 25, 2020

(65) Prior Publication Data
US 2022/0069684 A1 Mar. 3, 2022

(30) Foreign Application Priority Data
Dec. 20, 2018 (DE) ...................... 10 2018 222 494.3

(51) Int. Cl.
*H02K 15/14* (2006.01)
*H02K 5/10* (2006.01)
*H02K 15/12* (2006.01)

(52) U.S. Cl.
CPC .............. *H02K 15/14* (2013.01); *H02K 5/10* (2013.01); *H02K 15/12* (2013.01)

(58) Field of Classification Search
CPC .......... H02K 15/14; H02K 5/10; H02K 15/12; H02K 11/33
(Continued)

(56) References Cited

U.S. PATENT DOCUMENTS

2017/0005539 A1   1/2017 Yamasaki

FOREIGN PATENT DOCUMENTS

DE   10 2015 225 843 A1   6/2017
DE   10 2017 209 657 A1   12/2018
(Continued)

OTHER PUBLICATIONS

International Search Report corresponding to PCT Application No. PCT/EP2019/084061, dated Mar. 6, 2020 (Germand and English language document) (7 pages).

*Primary Examiner* — Jose A Gonzalez Quinones
(74) *Attorney, Agent, or Firm* — Maginot, Moore & Beck LLP

(57) ABSTRACT

In a method for connecting a housing cover to a cup-shaped housing structure for an electric machine, and a cup-shaped housing structure produced by means of the method, the cup-shaped housing structure has an opening and has an opening edge surrounding the opening. The housing cover is of cup-shaped form, wherein a collar of uninterrupted encircling form is integrally formed on a cup-shaped structure wall in the region of an opening edge, which collar points radially outward. In a first method step, the housing cover is at least partially inserted into the housing opening such that a channel is formed by mutually opposite regions of the housing cover wall and of the cup-shaped housing structure wall. In a further step, the channel is at least partially or completely filled with a sealing compound, which is in particular of elastic form, or an adhesive.

13 Claims, 2 Drawing Sheets

(58) Field of Classification Search
USPC .............................. 310/85, 88, 400, 418, 430
See application file for complete search history.

(56) References Cited

FOREIGN PATENT DOCUMENTS

| | | | |
|---|---|---|---|
| EP | 0 633 645 | A1 | 1/1995 |
| GB | 2 312 793 | A | 11/1997 |
| JP | H07-213030 | A | 8/1995 |
| JP | 2003-258443 | A | 9/2003 |
| JP | 2007-39043 | A | 2/2007 |
| JP | 2014-11884 | A | 1/2014 |
| JP | 2016-20012 | A | 2/2016 |
| JP | 2018-517133 | A | 6/2018 |
| WO | WO-2017102630 | A1 * | 6/2017 ............ H02K 11/21 |
| WO | 2018/143324 | A1 | 8/2018 |

* cited by examiner

METHOD AND DEVICE FOR DISPENSING SEALING COMPOUND, AND HOUSING FOR AN ELECTRIC MACHINE

This application is a 35 U.S.C. § 371 National Stage Application of PCT/EP2019/084061, filed on Dec. 6, 2019, which claims the benefit of priority to Serial No. DE 10 2018 222 494.3, filed on Dec. 20, 2018 in Germany, the disclosures of which are incorporated herein by reference in their entirety.

SUMMARY

The disclosure relates to a method for connecting a housing cover to a housing cup for an electric machine. The housing cup has an opening and an opening edge surrounding the opening. The housing cover is of cup-shaped form, wherein a collar of in particular uninterrupted encircling form is integrally formed on a cup wall in the region of an opening edge, which collar points radially outward.

In a first method step, the housing cover is at least partly inserted into the housing opening, so that a channel is formed by mutually opposite regions of the housing cover wall and the housing cup wall. In a further step, the channel is at least partly or completely filled with a sealing compound which is in particular of elastic form or an adhesive. Advantageously, the housing cup and the housing cover can thus both be bonded and also sealed off relative to each other in one method step, namely the filling of the channel with the sealing compound.

In a preferred embodiment, to fill the channel with the sealing compound, a dispensing device is inserted into the channel, which causes the sealing compound to flow into the channel. Advantageously, the channel can thus be filled cleanly.

In a preferred embodiment, the dispensing device is a dispensing pipe, which is guided circumferentially around the housing cover in the channel and puts the sealing compound into the channel as it is guided. The sealing compound can emerge here from an opening at one pipe end.

Thus, the sealing compound can advantageously be put into the channel mechanically and automatically.

In a preferred embodiment, a channel width and a depth extent of the channel as far as the collar is detected, and a volume of the sealing compound put in is changed along the channel circumference as a function of location in such a way that a filling level of the sealing compound as far as the housing cup edge is constant along the circumference. Advantageously, a non-central contact of the housing cover on the housing cup, which effects a radially circumferentially increasing or decreasing gap width of the channel, thus cannot lead to the sealing compound overflowing out of the channel, and thus to the housing cup being contaminated. Advantageously, the channel can thus be filled flush as far as the housing cup edge.

In a preferred embodiment, the channel depth is detected in particular interferometrically by means of electromagnetic radiation. Advantageously, the channel depth can thus be detected reliably.

In a preferred embodiment, the channel width is determined by means of an image capture device, and for this purpose an image dataset is produced, which represents the channel in a top view. Advantageously, the channel width can thus be detected reliably and automatically.

In a preferred embodiment, the sealing compound is put in as far as the edge of the housing cup and ends flush with the edge. Advantageously, an overlap width along the longitudinal extent of the housing cup, on which the housing wall of the housing cup and the wall of the housing cover overlap each other, can thus be used completely for bonding the housing cover and the housing cup adhesively to each other.

In a preferred embodiment, the sealing compound is thixotropic, wherein the sealing compound has a greater viscosity following the dispensing, in particular having been put into the channel, than as it is put into the channel. Advantageously, the sealing compound thus cannot flow into the housing interior through a gap formed between the collar and the housing cup wall. During the filling process, the sealing compound in the region of the dispensing pipe can still flow over an in particular predetermined flow section and thus fill the channel, wherein the flowing process of the sealing compound is then stopped by the increasing viscosity of the sealing agent.

Preferably, the sealing compound is designed, activated by means of ultraviolet radiation, to be cured by polyaddition. In a method step, the sealing compound, after being put into the channel, can be cured for this purpose by means of ultraviolet radiation emitted onto the sealing compound by an emitter for ultraviolet radiation. Preferably, the sealing compound is an elastomer, in particular a silicone elastomer cross-linked by means of ultraviolet radiation by means of polyaddition. The housing can thus advantageously be sealed so as to be media-tight with respect to media such as water or oil.

The disclosure also relates to a housing for an electric machine, in particular produced by the method of the above-described type. The housing has a housing cup with an opening, and a housing cover, which is designed to close the opening of the housing cup.

The housing cover is preferably of cup-shaped form. The housing cup has a cup wall, wherein a collar of uninterrupted encircling form is integrally formed on the cup wall in the region of an opening edge. The collar points radially outward, so that—in particular when the housing cup is closed—the collar forms a channel bottom of a channel. The channel is formed by mutually opposite regions of the cup wall of the housing cover and of the housing cup. The channel is filled by means of a sealing compound which is in particular of elastic form or an adhesive. Advantageously, the housing can thus be provided with little outlay and sealed off simply. Also advantageously, the housing cover is thus firmly bonded to the housing cup by means of the sealing compound.

The disclosure also relates to a device for dispensing sealing compound or an adhesive into a channel running around a housing cover. The device has a detection device, which is designed to detect a channel depth and a channel width along the radial channel circumference, and is designed to produce a depth dataset representing the channel depth and a width dataset representing the channel width.

The device preferably has a dispensing device for putting sealing compound into the channel and is designed to produce a sealing compound volume dataset, depending on the depth dataset and depending on the width dataset, which sealing compound volume dataset represents a sealing material volume to be dispensed by a dispensing device into the channel along the radial circumference and to fill the channel with sealing compound depending on the sealing compound volume dataset in such a way that the sealing compound does not overrun the housing cup edge. Advantageously, the sealing compound thus cannot overflow at narrow points of the channel along the channel circumference.

BRIEF DESCRIPTION OF THE DRAWINGS

The disclosure will now be described below by using figures and further exemplary embodiments. Further advantageous design variants emerge from a combination of the features described herein and depicted in the figures.

DETAILED DESCRIPTION

Figure 1:
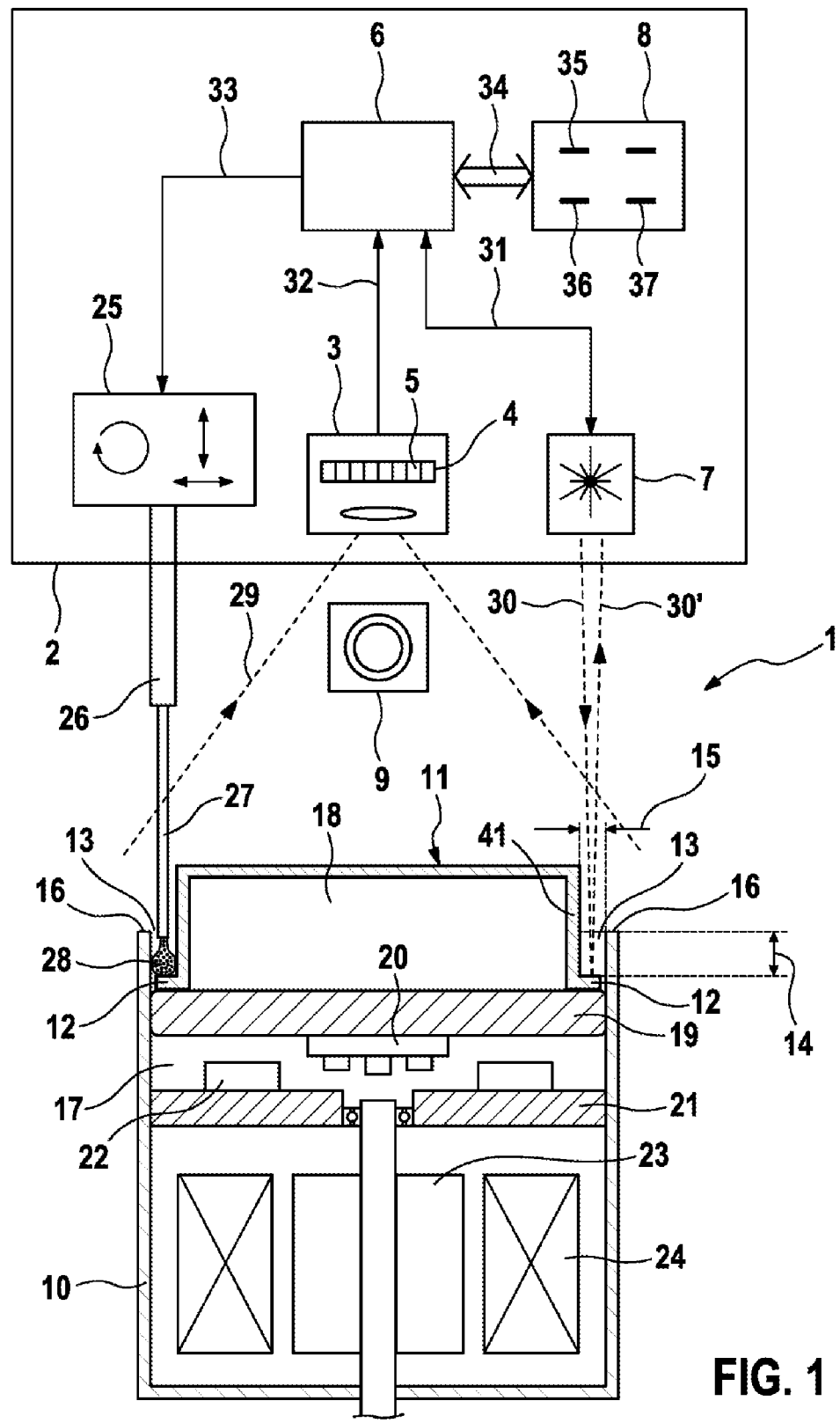
FIG. 1 shows an exemplary embodiment of a system for joining a housing cover to a housing cup, wherein a channel formed between the housing cover and the housing cup is surveyed by means of image capture and by means of an interferometer and, depending on the volume of the channel determined from the measurement, is suitably filled with sealing compound.

FIG. 1 shows an exemplary embodiment of a system 1 for joining a housing cover 11 to a housing cup 10, wherein the housing cup 10 and the housing cover 11 are a constituent part of a housing for an electric machine.

The housing cup 10 encloses a cavity 17, in which components of the electric machine are accommodated. In this exemplary embodiment, the housing cover 11 is of cup-shaped form and encloses a cavity 18. A collar 12 of encircling form adjoining a housing cover wall 41 of the housing cover forms a housing cover edge.

The system 1 comprises a device 2, which is designed to fill a channel 13 formed between the housing cover 11 and the housing cup 10 with a sealing compound 28. The collar 12 integrally formed on the wall 41 of the housing cover here forms a bottom of the channel 13 when the housing cup 10 is closed.

To this end, the device 2 has an image capture device 3, wherein the image capture device 3 has a detector 4 for detecting electromagnetic image radiation 29. The detector 4 is designed to produce an image dataset, depending on the image radiation 29 received, which dataset represents an object, in particular the housing cup 10 and the housing cover 11, in a top view. To this end, the detector 4 has a multiplicity of matrix elements, of which one matrix element 5 is designated by way of example. The matrix elements are each designed to generate a matrix element signal which represents a brightness value and/or a color value of the image radiation 29 received.

The detection device 3 is designed to produce the image dataset as a function of the matrix element signals and to output the same on an output. The device 2 also has a processing unit 6, in particular a microprocessor or a microcontroller. The processing unit 6 is designed to determine a width dimension 15 of the channel 3 along a channel circumference around the housing cover 11, depending on the image dataset 9 received on the input, and to produce a width dataset which—in particular as a function of location—represents a channel width of the channel along the channel circumference.

The processing unit 6 is connected to a memory 8 via a bidirectional connection 34 and is designed to produce a width dataset 35 which represents the determined channel width along the channel circumference, and to store the same in the memory 8 via the connection 34.

The device 2 also has a positioning device 25 and a filling device 26 which is connected to the positioning device 25 and which is designed to put the aforementioned sealing compound 28 into the channel along the channel circumference. The positioning device 25 is designed to move the filling device in at least two translational degrees of freedom, in particular to move to a position in a plane as a function of an actuating signal. The positioning device 25 is connected to the processing unit 6 via a connecting line 33 for this purpose, and can thus receive the actuating signal generated by the processing unit 6.

In this exemplary embodiment, the positioning device 25 is further designed to move the filling device 26, in particular a dispensing pipe connected to the filling device 26,—in particular as a function of the actuating signal—transversely with respect to the translational degrees of freedom. Thus, the positioning device can move the dispensing pipe into the channel 13, so that the sealing compound 28 can be put in there by the dispensing device 26.

In this exemplary embodiment, the device 2 also has a depth detection device 7 for detecting a channel depth 14 of the channel 13. The depth detection device 7 in this exemplary embodiment is formed by a laser interferometer, which is designed to transmit electromagnetic laser radiation 30 in the direction of the channel 13, which radiation is to be reflected at the channel bottom, in this exemplary embodiment from the circumferentially formed collar 12 of the housing cover 11, and is reflected back to the depth detection device 7 as reflected laser radiation 30'. The depth detection device 7 is designed to generate a depth signal as a function of the received laser radiation 30', which signal represents a distance of the depth detection device 7 from the channel bottom, in particular the collar 12, and to transmit this depth signal to the processing unit 6 via a connecting line 31.

The processing unit 6 is designed to determine the channel depth 14 of the channel 13 as a function of the depth signal received by the depth detection device 7—for example as a function of a previously stored offset—and to produce a depth dataset 36 which represents a channel depth 14 of the channels 13 along the radial circumference. The processing unit 6 can store the depth dataset 36 in the memory 8.

The processing unit 6 in this exemplary embodiment is designed to determine a sealing material volume to be dispensed by the dispensing device 26 into the channel 13 along the radial circumference depending on the width dataset and on the depth dataset, and to produce a corresponding sealing compound volume dataset. The processing unit 6 is also designed to store the sealing compound volume dataset 37 in the memory 8.

The housing for the electric machine, comprising the housing cup 10 and the housing cover 11, can then be joined together as follows:

The housing cover 11 can be inserted into a housing cup opening of the housing cup 10 until the radially projecting collar 12 is spaced apart from a housing cup edge 16 by the magnitude of the channel depth 14.

In this exemplary embodiment, the housing cup 10 comprises a cooling plate 19, to which at least one electric component, in particular a control unit 20, is thermally conductively connected. The housing cover 11, in particular the collar 12 of encircling form, then comes to lie on the cooling plate 19 after the housing cover 11 has been inserted into the housing cup 10. Between a wall 41 of the housing cover 11 and a wall of the housing cup 10, a channel having a channel width 15 is then formed, insofar as a diameter of the housing cover 11 is smaller than an opening of the housing cup 10.

Then—as previously described—the device 2 can produce the image dataset 9 and, as a function of the image dataset 9 and also as a function of the laser radiation 30' reflected from the channel bottom, in particular the collar 12, can produce the sealing compound volume dataset 37 and store the same in the memory 8.

In a further method step, the filling of the channel 13 with the sealing compound 28 can then be carried out. To this end, the processing unit 6 can determine the quantity, in particular volume and/or mass, of sealing compound to be dispensed for each location of the channel along the radial circumference, as a function of the sealing compound volume dataset 37 read from the memory 8, and transmit an actuating signal to the positioning device 25 via the connecting line 33 in order to move the dispensing device 26 to the appropriate location of the channel 13.

The processing unit 6 can thus control the positioning device 25 in such a way that the dispensing device 26 moves the dispensing pipe 27 in the channel 13 along the radial circumference in the channel along a closed curve and, in the process, for each channel location in the channel along the radial circumference, determine a quantity of sealing compound for each location of the channel along the material circumference—as a function of the sealing compound volume dataset 37 determined. The dispensing device 26 can then put the corresponding quantity of sealing compound into the channel for each channel location along the radial circumference as it is guided along in the channel, in particular by adapting the volume flow of the sealing compound.

The dispensing device 26 is designed to change a volume of the sealing compound to be dispensed per time interval. Thus, the channel can be filled continuously along the channel circumference by the dispensing device 26, wherein—in a manner dependent on a channel width which can change along the radial circumference—a filling level of the sealing compound in the channel which is constant along the radial circumference can be produced by the dispensing device by means of a quantity of the discharged sealing compound that changes along the channel circumference. The channel 13 can be filled with sealing compound by way of a single pass or multiple passes around the channel circumference.

In a further step, the sealing compound 28, in particular a silicone elastomer cross-linked by irradiation by means of ultraviolet radiation, can be cured by means of ultraviolet radiation emitted onto the sealing compound—from a transmitter for ultraviolet radiation not illustrated in FIG. 1.

The housing cup 10 and the housing cover 11 can be a constituent part of an electric machine. In this regard, FIG. 1 shows electric components of an electric machine, which are accommodated in the housing cup 10.

In this regard, the electric machine comprises the aforementioned cooling plate 19, the control unit 20, a bearing shield 21, a rotor 23, which is rotatably mounted in the bearing shield 21, and an output power stage 22, which is thermally conductively connected to the bearing shield 21. The machine also comprises a stator comprising stator coils 24.

Figure 2:
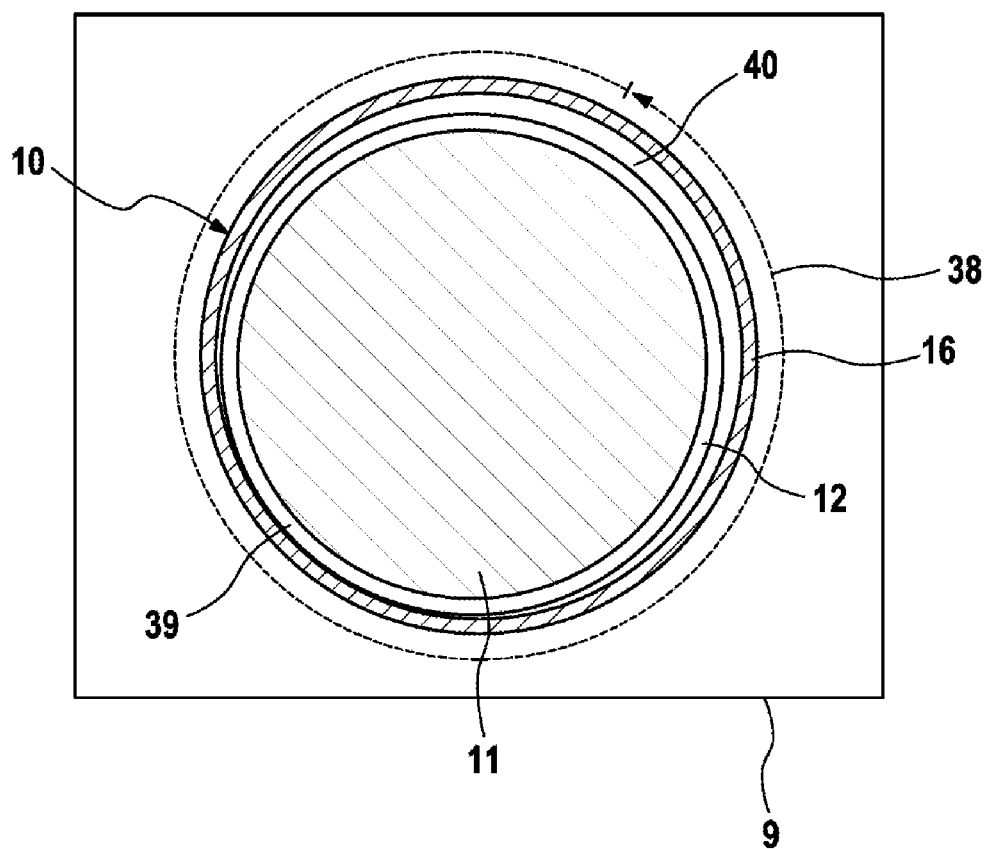
FIG. 2 shows the housing cover shown in FIG. 1 and the channel in a top view.

FIG. 2 shows an exemplary embodiment of an image dataset 9 which—as already shown in FIG. 1—can have been produced by the detection device 3.

The image dataset 9 represents the housing cover 11 and the housing cup 10, in particular the housing cup edge 16, in a top view. In this exemplary embodiment, the housing cover 11 has not been inserted centrally, and thus has been inserted eccentrically, into an opening of the housing cup 10, such that a channel width 15 of the channel 13 varies along a radial channel circumference 38. The channel width 15 of the channel 13 is thus, for example, formed to be narrower at a channel location 39 than at a channel location 40 that is opposite thereto. The device 2 illustrated in FIG. 1 can then fill the channel 13 uniformly with sealing compound 28 along the channel circumference 38, with a constant filling level along the channel circumference 38.

The invention claimed is:

1. A method for connecting a housing cover to a housing cup for an electric machine, the housing cup defining an opening and having an opening edge surrounding the opening, the housing cover having a cup shape, and a collar of uninterrupted encircling form is integrally formed on a cup wall of the housing cover in a region of the opening edge, the collar projecting radially outwardly, the method comprising:
   at least partially inserting the housing cover into the housing opening such that a channel is formed by mutually opposite regions of a housing cover wall and a housing cup wall; and
   at least partially filling the channel with a sealing compound
   wherein the at least partial filling of the channel with the sealing compound comprises inserting a dispensing device into the channel, which causes the sealing compound to flow into the channel,
   wherein the dispensing device includes a dispensing pipe, and the at least partial filling of the channel further comprises:
      circumferentially guiding the dispensing pipe around the housing cover in the channel; and
      dispensing the sealing compound into the channel as the dispensing pipe is guided around the housing cover.

2. The method as claimed in claim 1, wherein the at least partial filling of the channel with the sealing compound includes filling the channel as far as an edge of the housing cup such that the sealing compound ends flush with the edge.

3. The method as claimed in claim 1, wherein the sealing compound is thixotropic and has a greater viscosity following the at least partial filling of the channel than during the at least partial filling of the channel.

4. The method as claimed in claim 1, wherein the sealing compound is an elastic sealing compound.

5. The method as claimed in claim 1, wherein the collar forms a channel bottom of the channel.

6. A method for connecting a housing cover to a housing cup for an electric machine, the housing cup defining an opening and having an opening edge surrounding the opening, the housing cover having a cup shape, and a collar of uninterrupted encircling form is integrally formed on a cup wall of the housing cover in a region of the opening edge, the collar projecting radially outwardly, the method comprising:
   at least partially inserting the housing cover into the housing opening such that a channel is formed by mutually opposite regions of a housing cover wall and a housing cup wall;
   at least partially filling the channel with a sealing compound; and
   detecting a channel width and a depth extent of the channel as far as the collar,
   wherein the at least partially filling of the channel includes changing a volume of the sealing compound filled into the channel along the channel circumference as a function of location in such a way that a filling level of the sealing compound as far as the housing cup edge is constant along a circumference of the channel.

7. The method as claimed in claim 6, wherein the at least partial filling of the channel with the sealing compound comprises inserting a dispensing device into the channel, which causes the sealing compound to flow into the channel.

8. The method as claimed in claim 6, wherein the detecting of the channel depth comprises detecting the channel depth interferometrically using electromagnetic radiation.

9. The method as claimed in claim 6, wherein the detecting of the channel width includes using an image capture device to produce an image dataset that represents the channel in a top view.

10. The method as claimed in claim 6, wherein the collar forms a channel bottom of the channel.

11. A housing for an electric machine, comprising:
   a housing cup defining an opening; and
   a housing cover configured to close the opening of the housing cup, the housing cover having a cup shape,
   wherein a collar of uninterrupted encircling form integrally formed on a cup wall of the housing cover in a region of an opening edge, the collar projecting radially outwardly such that, when the housing is closed, the collar forms a channel bottom of a channel that is defined by mutually opposite regions of the cup wall of the housing cover and of a wall of the housing cup,
   wherein the channel is filled by a sealing compound in such a way that the channel is filled by the sealing compound as far as an edge of the housing cup such that the sealing compound ends flush with the edge.

12. The housing as claimed in claim 11, wherein the sealing compound is an elastic sealing compound.

13. A device for dispensing sealing compound into a channel that extends around a housing cover, the device comprising:
   at least one detection device configured to detect a channel depth of the channel and a channel width of the channel along a radial channel circumference; and
   a dispensing device configured to dispense the sealing compound into the channel,
   wherein the device is configured to:
      using the at least one detection device, produce a depth dataset representing the channel depth and a width dataset representing the channel width;
      produce a sealing compound volume dataset based on the depth dataset and the width dataset, the sealing compound volume dataset representing a sealing material volume to be dispensed by the dispensing device into the channel along the radial channel circumference; and
      operate the dispensing device to fill the channel with sealing compound depending on the sealing compound volume dataset in such a way that the sealing compound does not overrun an edge of the housing cup.

* * * * *